(12) United States Patent
Feldermann et al.

(10) Patent No.: US 8,461,260 B2
(45) Date of Patent: Jun. 11, 2013

(54) IMPACT-MODIFIED POLYCARBONATE COMPOSITIONS

(75) Inventors: Achim Feldermann, Düsseldorf (DE); Eckhard Wenz, Köln (DE); Andreas Seidel, Dormagen (DE); Evgueni Avtomonov, Leverkusen (DE)

(73) Assignee: Bayer Intellectual Proeprty GmbH, Monheim (DE)

( * ) Notice: Subject to any disclaimer, the term of this patent is extended or adjusted under 35 U.S.C. 154(b) by 479 days.

(21) Appl. No.: 12/640,328

(22) Filed: Dec. 17, 2009

(65) Prior Publication Data
US 2010/0160534 A1 Jun. 24, 2010

(30) Foreign Application Priority Data

Dec. 23, 2008 (DE) .......................... 10 2008 062 904
Jan. 23, 2009 (DE) .......................... 10 2009 005 762

(51) Int. Cl.
*C08L 25/12* (2006.01)
*C08L 55/02* (2006.01)
*C08L 69/00* (2006.01)
*C08L 83/10* (2006.01)

(52) U.S. Cl.
USPC .............................. 525/64; 525/110; 525/185

(58) Field of Classification Search
USPC .......................................... 525/64, 110, 185
See application file for complete search history.

(56) References Cited

U.S. PATENT DOCUMENTS

| | | | |
|---|---|---|---|
| 2,891,920 A | 6/1959 | Hyde et al. | |
| 3,294,725 A | 12/1966 | Findlay et al. | |
| 3,419,634 A | 12/1968 | Vaughn | |
| 3,553,167 A | 1/1971 | Schnell et al. | |
| 3,644,574 A | 2/1972 | Jackson et al. | |
| 3,692,744 A | 9/1972 | Rich et al. | |
| 4,013,613 A | 3/1977 | Abolins et al. | |
| 4,075,173 A | 2/1978 | Maruyama et al. | |
| 4,176,224 A | 11/1979 | Bier et al. | |
| 4,311,823 A | 1/1982 | Imai et al. | |
| 4,334,053 A | 6/1982 | Freitag et al. | |
| 4,584,360 A | 4/1986 | Paul et al. | |
| 4,806,593 A | 2/1989 | Kress et al. | |
| 4,877,831 A | 10/1989 | Hongo et al. | |
| 4,888,388 A | 12/1989 | Hongo et al. | |
| 5,807,914 A | 9/1998 | Obayashi et al. | |
| 2002/0077417 A1 | 6/2002 | Itagaki | |
| 2008/0108751 A1* | 5/2008 | Rogunova et al. | ............... 525/64 |

FOREIGN PATENT DOCUMENTS

| | | |
|---|---|---|
| DE | 30 07 934 A1 | 9/1981 |
| DE | 38 32 396 A1 | 2/1990 |
| EP | 0 430 134 A2 | 11/1990 |
| EP | 0 641 827 A2 | 5/1994 |
| GB | 1 464 449 | 2/1977 |
| GB | 1 552 558 | 9/1979 |
| JP | 2000-017136 A | 1/2000 |
| JP | 2002-069282 A1 | 3/2002 |
| JP | 2006249163 A * | 9/2006 |
| WO | 00/39210 A1 | 7/2000 |

* cited by examiner

*Primary Examiner* — Kelechi Egwim
(74) *Attorney, Agent, or Firm* — Baker Donelson Bearman; Bearman Caldwell & Berkowitz, PC

(57) ABSTRACT

Impact-modified polycarbonate compositions are disclosed that comprise a first graft polymer based on silicone-acrylate composite rubber as graft base, wherein the amount of silicone rubber is from 65 to 95 wt. % (based on the graft base), and a second graft polymer containing free copolymer, that is to say copolymer that is not chemically bonded to the rubber, and having a weight-average molecular weight of from 60,000 to 150,000 g/mol. The use of the polycarbonate compositions in the production of molded articles, and to the molded articles themselves are also disclosed. The compositions and molding compositions have an optimum combination of good elongation at tear, good hydrolytic stability and low melt viscosity.

20 Claims, No Drawings

IMPACT-MODIFIED POLYCARBONATE COMPOSITIONS

CROSS REFERENCE TO RELATED APPLICATION

This application claims priority to DE 10 2008 062904 filed Dec. 23, 2008, the contents of which are incorporated herein by reference, in its entirety and DE 10 2009 005762 filed Jan. 23, 2009.

BACKGROUND

1. Field

The present disclosure relates to impact-modified polycarbonate compositions that comprise a first graft polymer comprising silicone-acrylate composite rubber as a graft base, wherein the amount of silicone rubber is from 65 to 95 wt. % (based on the graft base), and a second graft polymer containing free copolymer, that is to say copolymer that is not chemically bonded to the rubber, and having a weight-average molecular weight of from 60,000 to 150,000 g/mol. The use of the polycarbonate compositions in the production of moulded articles, and to the moulded articles themselves is also disclosed.

2. Description of Related Art

US 2002/077417 A1 discloses flame-protected compositions comprising (a) polycarbonate, (b) graft polymer with a silicone-acrylate composite rubber, wherein the ratio of silicone to acrylate is from 99:1 to 1:99, (c) optionally filler, for example talc, (d) phosphoric acid esters as flameproofing agents, (e) optionally further additives, for example ABS, SAN and antidripping agents. There are disclosed as examples compositions comprising Metablen® S-2001, which is a graft polymer with a graft base of silicone-butyl acrylate composite rubber, which consists of about 17 wt. % methyl methacrylate, about 9 wt. % organosiloxane and about 74 wt. % butyl acrylate. However, US 2002/077417 A1 does not disclose compositions comprising a graft polymer with a silicone-acrylate composite rubber as graft base, wherein the amount of silicone rubber is from 65 to 95 wt. % (based on the graft base).

JP-A 08-259791 discloses flame-protected compositions comprising polycarbonate and a silicone-acrylate rubber with from 30 to 99% siloxane.

JP-A 2000-017136 discloses compositions comprising polycarbonate, from 1 to 40 wt. % oligomeric phosphoric acid esters and graft polymer with a graft base of silicone-acrylate rubber which contains from 60 to 99 wt. % polyorganosiloxane, optionally polytetrafluoroethylene and optionally talc.

JP-A 2002-069282 discloses compositions comprising polycarbonate, composite rubber (for example Metablen® SX-005), oligomeric phosphoric acid esters, silicone oil, optionally polytetrafluoroethylene and optionally additives.

WO-A 00/39210 discloses compositions comprising polycarbonate, copolymer, oligomeric phosphoric acid esters, graft polymer (for example Metablen S-2001) with a silicone-acrylate rubber as graft base, wherein the amount of polyorganosiloxane is from 3 wt. % to 90 wt. %, optionally polytetrafluoroethylene and a reinforcing material, for example talc.

EP-A 0 641 827 discloses compositions comprising aromatic polycarbonate, graft polymer of vinyl monomer on diene rubber, phosphoric acid esters, polytetrafluoroethylene, inorganic filler, for example talc, and composite rubber of silicone and acrylate rubber.

JP-A 07316409 discloses compositions comprising polycarbonate, phosphoric acid esters, graft polymer with a silicone-acrylate rubber as graft base, wherein the amount of polyorganosiloxane is from 1 to 99 wt. % and the amount of polyalkyl (meth)acrylate rubber is from 99 to 1 wt. %.

SUMMARY

The above-mentioned prior art documents fail to appreciate compositions that comprise a second graft polymer containing free copolymer, that is to say copolymer that is not chemically bonded to the rubber, having a weight-average molecular weight of from 60,000 to 150,000.

An object was to provide impact-modified polycarbonate moulding compositions having an optimum combination of good elongation at tear, good hydrolytic stability and low melt viscosity.

It has accordingly been found, surprisingly, that the above-mentioned technical object as well as others can be achieved, for example, by compositions comprising A) from 40 to 99 parts by weight, preferably from 50 to 90 parts by weight, particularly preferably from 60 to 80 parts by weight (in each case based on the sum of the parts by weight of components A+B+C+D), of aromatic polycarbonate and/or aromatic polyester carbonate, B) from 0.5 to 20 parts by weight, preferably from 3 to 13 parts by weight, particularly preferably from 8 to 13 parts by weight (in each case based on the sum of the parts by weight of components A+B+C+D), of a first graft polymer, characterised in that the graft base is a silicone-acrylate composite rubber, in a preferred embodiment of interpenetrating silicone rubber and polyalkyl (meth)acrylate rubber, wherein the amount of silicone rubber is from 65 to 95 wt. %, preferably from 75 to 95 wt. %, in particular from 80 to 95 wt. % (based on the graft base), C) from 0.5 to 40 parts by weight, preferably from 3 to 20 parts by weight, particularly preferably from 3 to 7 parts by weight (based on the sum of the parts by weight of components A+B+C+D), of a second graft polymer containing free copolymer, that is to say copolymer that is not chemically bonded to the rubber, having a weight-average molecular weight of from 60,000 to 150,000 g/mol, preferably from 70,000 to 130,000 g/mol, particularly preferably from 70,000 to 90,000 g/mol, D) from 0 to 20 parts by weight, preferably from 0 to 16 parts by weight, particularly preferably from 3 to 16 parts by weight (based on the sum of the parts by weight of components A+B+C+D), of one or more polymers selected from the group consisting of rubber-free vinyl (co)polymer and polyalkylene terephthalate, E) from 0 to 50 parts by weight, preferably from 0.5 to 25 parts by weight, particularly preferably from 0.5 to 5 parts by weight (in each case based on the sum of the parts by weight of components A+B+C+D), of additives, wherein the composition is free or substantially free of flameproofing agents, and wherein all parts by weight in the present application are so normalised that the sum of the parts by weight of components A+B+C+D in the composition is 100.

The instant composition can also consist essentially of the listed components. The instant composition can also consist of exclusively the listed components.

The foregoing and other aspects of the present disclosure are explained in detail in the detailed description and examples set forth below.

DETAILED DESCRIPTION

Component A

Aromatic polycarbonates and/or aromatic polyester carbonates according to component A that are suitable are generally known in the literature and/or can be prepared by processes known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see e.g. DE-A 3 077 934).

The preparation of aromatic polycarbonates can be carried out, for example, by reaction of diphenols with carbonic acid halides, preferably phosgene, and/or with aromatic dicarboxylic acid dihalides, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerisation process by reaction of diphenols with, for example, diphenyl carbonate is also possible.

Diphenols for the preparation of the aromatic polycarbonates and/or aromatic polyester carbonates are preferably those of formula (I)

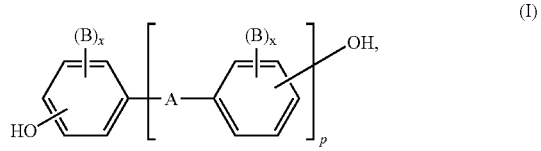

wherein
A is a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which further aromatic rings optionally containing heteroatoms can be fused,
or a radical of formula (II) or (III)

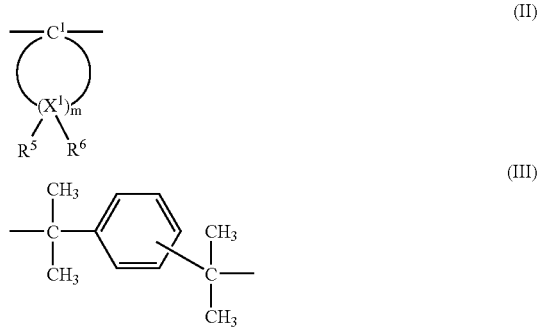

B is in each case $C_1$- to $C_{12}$-alkyl, preferably methyl, halogen, preferably chlorine and/or bromine,
x each independently of the other is 0, 1 or 2,
p is 1 or 0, and
$R^5$ and $R^6$ can be chosen individually for each $X^1$ and each independently of the other is hydrogen or $C_1$- to $C_6$-alkyl, preferably hydrogen, methyl or ethyl, $X^1$ is carbon and
m is an integer from 4 to 7, preferably 4 or 5, with the proviso that on at least one atom $X^1$, $R^5$ and $R^6$ are simultaneously alkyl.

Preferred diphenols include hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)ethers, bis-(hydroxyphenyl)sulfoxides, bis-(hydroxyphenyl)ketones, bis-(hydroxyphenyl)sulfones and α,α-bis-(hydroxyphenyl)-diisopropyl-benzenes, and derivatives thereof brominated and/or chlorinated on the ring.

Particularly preferred diphenols include 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenylsulfone and di- and tetra-brominated or chlorinated derivatives thereof, for example 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred. The diphenols can be used on their own and/or in the form of any arbitrary mixture. The diphenols are known in the literature and/or are obtainable according to processes known in the literature.

Chain terminators suitable for the preparation of thermoplastic aromatic polycarbonates include, for example, phenol, p-chlorophenol, p-tert-butylphenol or 2,4,6-tribromophenol, but also long-chained alkylphenols, such as 4-[2-(2,4,4-trimethylpentyl)]-phenol, 4-(1,3-tetramethylbutyl)-phenol according to DE-A 2 842 005 or monoalkylphenol or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used is generally from 0.5 mol % to 10 mol %, based on the molar sum of the diphenols used in a particular case.

The thermoplastic aromatic polycarbonates typically have mean weight-average molecular weights ($M_w$, measured, for example, by GPC, ultracentrifugation or scattered light measurement) of from 10,000 to 20,000 g/mol, preferably from 15,000 to 80,000 g/mol, particularly preferably from 24,000 to 32,000 g/mol.

The thermoplastic aromatic polycarbonates can be branched in any known manner, preferably by the incorporation of from 0.05 to 2.0 mol %, based on the sum of the diphenols used, of compounds having a functionality of three, or more than three, for example, those having three or more phenolic groups.

Both homopolycarbonates and/or copolycarbonates are suitable. For the preparation of copolycarbonates of component A, it is also possible to use from 1 to 25 wt. %, preferably from 2.5 to 25 wt. %, based on the total amount of diphenols to be used, of polydiorganosiloxanes having hydroxyaryloxy end groups. These are known (see U.S. Pat. No. 3,419,634) and/or can be prepared according to processes known in the literature. The preparation of copolycarbonates containing polydiorganosiloxanes is described in DE-A 3 334 782.

Preferred polycarbonates in addition to the bisphenol A homopolycarbonates include the copolycarbonates of bisphenol A with up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and naphthalene-2,6-dicarboxylic acid. Mixtures of the diacid dichlorides of isophthalic acid and terephthalic acid in a ratio of from 1:20 to 20:1 are particularly preferred.

In the preparation of polyester carbonates, a carbonic acid halide, preferably phosgene, can additionally be used concomitantly as bifunctional acid derivative.

Suitable chain terminators for the preparation of the aromatic polyester carbonates, in addition to the monophenols already mentioned, also include the chlorocarbonic acid esters thereof and the acid chlorides of aromatic monocarboxylic acids, which can optionally be substituted by $C_1$- to $C_{22}$-alkyl groups or by halogen atoms, as well as aliphatic $C_2$- to $C_{22}$-monocarboxylic acid chlorides.

The amount of chain terminators is in each case preferably from 0.1 to 10 mol %, based in the case of phenolic chain terminators on moles of diphenol, and in the case of monocarboxylic acid chloride, chain terminators on moles of dicarboxylic acid dichloride.

The aromatic polyester carbonates can also optionally contain aromatic hydroxycarboxylic acids incorporated therein.

The aromatic polyester carbonates can be both linear and branched in known manner (see in this connection DE-A 2 940 024 and DE-A 3 007 934).

There can be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5'-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4', 4''-dihydroxytriphenyl)-methyl]-benzene, in amounts of from 0.01 to 1.0 mol %, based on diphenols used. Phenolic branching agents can be placed in a vessel with the diphenols; acid chloride branching agents can be introduced together with the acid dichlorides.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks or distributed randomly.

The relative solution viscosity ($\eta_{rel}$) of the aromatic polycarbonates and polyester carbonates is advantageously in the range from 1.18 to 1.4, preferably from 1.20 to 1.32 (measured on solutions of 0.5 g of polycarbonate or polyester carbonate in 100 ml of methylene chloride solution at 25° C.).

The thermoplastic aromatic polycarbonates and polyester carbonates can be used on their own and/or in any arbitrary mixture.

Component B

Component B preferably comprises one or more graft polymers of
B.1 from 5 to 95 wt. %, preferably from 10 to 90 wt. %, in particular from 10 to 50 wt. %, of one or more vinyl monomers on
B.2 from 95 to 5 wt. %, preferably from 90 to 10 wt. %, in particular from 50 to 90 wt. %, of one or more silicone-acrylate composite rubbers as graft base, the silicone-acrylate rubber comprising
B.2.1 from 65 to 95 wt. %, preferably from 75 to 95 wt. %, in particular from 80 to 95 wt. %, silicone rubber and
B.2.2 from 5 to 35 wt. %, preferably from 5 to 25 wt. %, in particular from 5 to 20 wt. %, polyalkyl (meth) acrylate rubber,
wherein in a preferred embodiment the two mentioned rubber components B.2.1 and B.2.2 interpenetrate in the composite rubber in such a manner that they cannot substantially be separated from one another.

The graft copolymers B can be prepared by radical polymerisation, for example, by emulsion, suspension, solution or mass polymerisation, preferably by emulsion polymerisation.

In a preferred embodiment, the graft polymers have a core-shell structure with a rubber core and a vinyl polymer resin shell.

Suitable monomers B.1 include vinyl monomers such as vinyl aromatic compounds and/or vinyl aromatic compounds substituted on the ring (such as styrene, α-methylstyrene, p-methylstyrene, p-chlorostyrene), methacrylic acid ($C_1$-$C_8$)-alkyl esters (such as methyl methacrylate, ethyl methacrylate, 2-ethylhexyl methacrylate, allyl methacrylate), acrylic acid ($C_1$-$C_8$)-alkyl esters (such as methyl acrylate, ethyl acrylate, n-butyl acrylate, tert-butyl acrylate), organic acids (such as acrylic acid, methacrylic acid) and/or vinyl cyanides (such as acrylonitrile and methacrylonitrile) and/or derivatives (such as anhydrides and imides) of unsaturated carboxylic acids (for example maleic anhydride and N-phenyl-maleimide). These vinyl monomers can be used on their own and/or in mixtures of at least two monomers.

Preferred monomers B.1 can be selected from at least one of the monomers styrene, α-methylstyrene, methyl methacrylate, n-butyl acrylate and acrylonitrile. A mixture of styrene and acrylonitrile or methyl methacrylate is particularly preferably used as the monomer B.1. In a particularly preferred embodiment, methyl methacrylate is used as the monomer B.1.

The glass transition temperature of the graft base B.2 typically is <10° C., preferably <0° C., particularly preferably <−20° C. The graft base B.2 generally has a mean particle size ($d_{50}$ value) of from 0.05 to 10 µm, preferably from 0.06 to 1 µm, particularly preferably from 0.08 to 0.5 µm, in particular from 0.08 to 0.25 µm.

The mean particle size $d_{50}$ is the diameter above and below which in each case 50 wt. % of the particles lie. It can be determined by means of ultracentrifuge measurement (W. Scholtan, H. Lange, Kolloid-Z. und Z. Polymere 250 (1972), 782-796).

Suitable graft bases B.2 include silicone-acrylate rubbers having a high silicone content. Such silicone-acrylate rubbers are composite rubbers having graft-active sites, containing from 65 to 95 wt. %, preferably from 75 to 95 wt. %, in particular from 80 to 95 wt. %, of the silicone rubber component and from 5 to 35 wt. %, preferably from 5 to 25 wt. %, in particular from 5 to 20 wt. %, of the polyalkyl (meth)acrylate rubber component, the two mentioned rubber components, in a preferred embodiment, interpenetrating in the composite rubber in such a manner that they cannot substantially be separated from one another.

Silicone-acrylate rubbers are known and described, for example, in U.S. Pat. No. 5,807,914, EP 430134 and U.S. Pat. No. 4,888,388.

Suitable silicone rubber components of the silicone-acrylate rubbers are silicone rubbers having graft-active sites, whose preparation method is described, for example, in U.S. Pat. No. 2,891,920, U.S. Pat. No. 3,294,725, DE-OS 3 631 540, EP 249964, EP 430134 and U.S. Pat. No. 4,888,388.

The silicone rubber is preferably prepared by emulsion polymerisation, in which siloxane monomer structural units, crosslinkers or branching agents (IV) and optionally grafting agents (V) are used.

There can be used as the siloxane monomer structural units, for example and preferably, dimethylsiloxane or cyclic organosiloxanes having at least 3 ring members, preferably from 3 to 6 ring members, such as, for example and preferably, hexamethylcyclotrisiloxane, octamethylcyclotetrasiloxane, decamethylcyclopentasiloxane, dodecamethylcyclohexasiloxane, trimethyl-triphenyl-cyclotrisiloxane, tetramethyl-tetraphenyl-cyclotetrasiloxane, octaphenylcyclotetrasiloxane. The organosiloxane monomers can be used on their own and/or in the form of mixtures of 2 or more monomers. The silicone rubber preferably contains not less than 50 wt. % and particularly preferably not less than 60 wt. % organosiloxane, based on the total weight of the silicone rubber component.

As crosslinkers or branching agents (IV) there are preferably used silane-based crosslinkers having a functionality of 3 or 4, particularly preferably 4. Preferred examples which may be mentioned include: trimethoxymethylsilane, triethoxyphenylsilane, tetramethoxysilane, tetraethoxysilane, tetra-n-propoxysilane and tetrabutoxysilane. The crosslinker can be used on its own and/or in a mixture of two or more. Tetraethoxysilane is particularly preferred.

The crosslinker can generally be used in an amount in the range from 0.1 to 40 wt. %, based on the total weight of the silicone rubber component. The amount of crosslinker is preferably so chosen that the degree of swelling of the silicone rubber, measured in toluene, is from 3 to 30, preferably from 3 to 25 and particularly preferably from 3 to 15. The degree of swelling is defined as the weight ratio of the amount of toluene absorbed by the silicone rubber when it is saturated with toluene at 25° C. and the amount of silicone rubber in the dry state. The determination of the degree of swelling is described in detail in EP 249964.

If the degree of swelling is less than 3, that is to say if the content of crosslinker is too high, the silicone rubber may not have adequate rubber elasticity. If the swelling index is greater than 30, the silicone rubber may be unable to form domain structures in the matrix polymer and therefore may not significantly improve impact strength either; the effect could then potentially be similar to that of simply adding polydimethylsiloxane.

Tetrafunctional branching agents are preferred to trifunctional branching agents in some cases because the degree of swelling can then more easily be controlled within the above-described advantageous limits.

Suitable grafting agents (V) include compounds that are capable of forming structures of the following formulae:

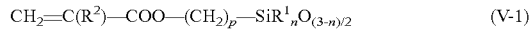

$$CH_2=C(R^2)-COO-(CH_2)_p-SiR^1{}_nO_{(3-n)/2} \quad (V-1)$$

$$CH_2=CH-SiR^1{}_nO_{(3-n)/2} \quad (V-2) \text{ or}$$

$$HS-(CH_2)_p-SiR^1{}_nO_{(3-n)/2} \quad (V-3),$$

wherein
$R^1$ represents $C_1$-$C_4$-alkyl, preferably methyl, ethyl or propyl, or phenyl,
$R^2$ represents hydrogen or methyl,
n denotes 0, 1 or 2 and
p denotes an integer from 1 to 6.

Acryloyl- or methacryloyl-oxysilanes are particularly suitable for forming the above-mentioned structure (V-1) and have a high grafting efficiency. Effective formation of the graft chains is thereby generally ensured, and the impact strength of the resulting resin composition is accordingly and typically promoted.

Preferred examples which may be mentioned include: β-methacryloyloxy-ethyldimethoxymethyl-silane, γ-methacryloyloxy-propylmethoxydimethyl-silane, γ-methacryloyloxy-propyldimethoxymethyl-silane, γ-methacryloyloxy-propyltrimethoxy-silane, γ-methacryloyloxy-propylethoxydiethyl-silane, γ-methacryloyloxy-propyldiethoxymethyl-silane, δ-methacryloyl-oxy-butyldiethoxymethyl-silane or mixtures thereof.

Preferably from 0 to 20 wt. % of grafting agent, based on the total weight of the silicone rubber, is used.

Suitable polyalkyl (meth)acrylate rubber components of the silicone-acrylate rubbers can be prepared from methacrylic acid alkyl esters and/or acrylic acid alkyl esters, a crosslinker (VI) and a grafting agent (VII). Examples of preferred methacrylic acid alkyl esters and/or acrylic acid alkyl esters include the $C_1$- to $C_8$-alkyl esters, for example methyl, ethyl, n-butyl, tert-butyl, n-propyl, n-hexyl, n-octyl, n-lauryl and 2-ethylhexyl esters; haloalkyl esters, preferably halo-$C_1$-$C_8$-alkyl esters, such as chloroethyl acrylate, and mixtures of these monomers. n-Butyl acrylate is particularly preferred.

As crosslinkers (VI) for the polyalkyl (meth)acrylate rubber component of the silicone-acrylate rubber there can be used, for example, monomers having more than one polymerisable double bond. Preferred examples of crosslinking monomers are esters of unsaturated monocarboxylic acids having from 3 to 8 carbon atoms and unsaturated monohydric alcohols having from 3 to 12 carbon atoms, or saturated polyols having from 2 to 4 OH groups and from 2 to 20 carbon atoms, such as ethylene glycol dimethacrylate, propylene glycol dimethacrylate, 1,3-butylene glycol dimethacrylate and 1,4-butylene glycol dimethacrylate. The crosslinkers can be used on their own and/or in mixtures of at least two crosslinkers.

Examples of preferred grafting agents (VII) include allyl methacrylate, triallyl cyanurate, triallyl isocyanurate or mixtures thereof. Allyl methacrylate can also be used as crosslinker (VI). The grafting agents can be used on their own and/or in mixtures of at least two grafting agents.

The amount of crosslinker (VI) and grafting agent (VII) is from 0.1 to 20 wt. %, based on the total weight of the polyalkyl (meth)acrylate rubber component of the silicone-acrylate rubber.

In principle, the silicone-acrylate rubber can be prepared, for example, either by polymerisation of the silicone rubber in a first polymerisation step and of the acrylate rubber component in a second polymerisation step, or in the reverse order, as desired.

In a preferred embodiment, the silicone-acrylate rubber can be prepared by first preparing the silicone rubber in the form of an aqueous latex. The silicone rubber can be prepared by emulsion polymerisation, as described, for example, in U.S. Pat. No. 2,891,920 and U.S. Pat. No. 3,294,725. To that end, a mixture containing organosiloxane, crosslinker and optionally grafting agent is mixed with water, with shearing, for example by means of a homogeniser, in the presence of an emulsifier, preferably an emulsifier based on sulfonic acid, for example alkylbenzenesulfonic acid or alkylsulfonic acid, the mixture polymerising completely to give the silicone rubber latex. An alkylbenzenesulfonic acid is particularly suitable because it acts not only as an emulsifier but also as a polymerisation initiator. In this case, a combination of the sulfonic acid with a metal salt of an alkylbenzenesulfonic acid or with a metal salt of an alkylsulfonic acid is advantageous because the polymer is thereby stabilised during the subsequent graft polymerisation.

After the polymerisation, the reaction is ended by neutralising the reaction mixture by adding an aqueous alkaline solution, for example by adding an aqueous sodium hydroxide, potassium hydroxide and/or sodium carbonate solution.

In the preferred embodiment, the latex is then enriched with the methacrylic acid alkyl esters and/or acrylic acid alkyl esters that are to be used, the crosslinker (VI) and the grafting agent (VII), and a polymerisation is carried out. Preference is given to an emulsion polymerisation initiated by radicals, for example by a peroxide, an azo or a redox initiator. Particular preference is given to the use of a redox initiator system, especially of a sulfoxylate initiator system prepared by combining iron sulfate, disodium ethylenediaminetetraacetate, rongalite and hydroperoxide.

The grafting agent (V) that is used in the preparation of the silicone rubber generally has the effect of bonding the polyalkyl (meth)acrylate rubber component covalently to the silicone rubber component. In the polymerisation, the two rubber components interpenetrate and thus form the composite rubber, which can no longer readily be separated into its constituents of silicone rubber component and polyalkyl (meth)acrylate rubber component after the polymerisation.

For the preparation of the silicone-acrylate graft rubbers B, the monomers B.1 are grafted on to the rubber base B.2.

The polymerisation methods described in EP 249964, EP 430134 and U.S. Pat. No. 4,888,388 can be used, for example.

For example, the graft polymerisation can suitably be carried out according to the following polymerisation method: In a single- or multi-stage emulsion polymerisation initiated by radicals, the desired vinyl monomers B.1 are polymerised on to the graft base, which is present in the form of an aqueous latex. The grafting efficiency should thereby be as high as possible and is preferably greater than or equal to 10%. The grafting efficiency is significantly dependent on the grafting agent (V) or (VII) that is used. After the polymerisation to the silicone-acrylate graft rubber, the aqueous latex is added, for example, to hot water in which metal salts, for example calcium chloride or magnesium sulfate, have previously been dissolved. The silicone-acrylate graft rubber thereby coagulates and can subsequently be separated and optionally, in a preferred embodiment, washed.

Component C

Component C is one or more graft polymers of
C.1) from 5 to 95 wt. %, preferably from 30 to 90 wt. %, particularly preferably from 80 to 90 wt. %, in particular from 85 to 90 wt. %, based on component C, of a mixture of
C.1.1) from 65 to 85 wt. %, preferably from 70 to 80 wt. %, based on C.1, of at least one monomer selected from the group of the vinyl aromatic compounds (for example styrene, α-methylstyrene), vinyl aromatic compounds substituted on the ring (for example p-methylstyrene, p-chlorostyrene) and methacrylic acid ($C_1$-$C_8$)-alkyl esters (for example methyl methacrylate, ethyl methacrylate) and C.1.2) from 15 to 35 wt. %, preferably from 20 to 30 wt. %, based on C.1, of at least one monomer selected from the group of the vinyl cyanides (for example unsaturated nitriles such as acrylonitrile and methacrylonitrile), (meth)acrylic acid ($C_1$-$C_8$)-alkyl esters (for example methyl methacrylate, n-butyl acrylate, tert-butyl acrylate) and derivatives (for example anhydrides and imides) of unsaturated carboxylic acids (for example maleic anhydride and N-phenyl-maleimide)
on
C.2) from 95 to 5 wt. %, preferably from 70 to 10 wt. %, particularly preferably from 20 to 10 wt. %, in particular from 15 to 10 wt. %, of at least one graft base having a glass transition temperature <0° C., preferably <−20° C., the graft base C.2) generally having a mean particle size ($d_{50}$ value) of from 0.05 to 10 μm, preferably from 0.1 to 5 μm, particularly preferably from 0.15 to 2 μm, in particular from 0.5 to 1.5 μm.

The mean particle size $d_{50}$ is the diameter above and below which in each case 50 wt. % of the particles lie. It can be determined by means of ultracentrifuge measurement (W. Scholtan, H. Lange, Kolloid, Z. and Z. Polymere 250 (1972), 782-1796).

Preferred monomers C.1.1 can be selected from at least one of the monomers styrene, α-methylstyrene and methyl methacrylate; preferred monomers C.1.2 are selected from at least one of the monomers acrylonitrile, maleic anhydride and methyl methacrylate.

Particularly preferred monomers include C.1.1 styrene and C.1.2 acrylonitrile.

Suitable graft bases C.2 for the graft polymers C are, for example, diene rubbers, diene-vinyl block copolymer rubbers, EP(D)M rubbers, that is to say rubbers based on ethylene/propylene and optionally diene, acrylate, polyurethane, silicone, chloroprene and ethylene/vinyl acetate rubbers, as well as mixtures of such rubbers, with the exception of silicone-acrylate (composite) rubbers.

Preferred graft bases C.2 include diene rubbers selected from at least one diene rubber of the group consisting of butadiene rubber, isoprene rubber, copolymers of diene rubbers, copolymers of butadiene rubber and further copolymerisable monomers (e.g. according to C.1.1 and C.1.2) and copolymers of isoprene rubber and further copolymerisable rubbers (e.g. according to C.1.1 and C.1.2). Pure polybutadiene rubber and styrene-butadiene block copolymer rubber are particularly preferred.

The gel content of the graft polymers is at least 15 wt. %, preferably at least 20 wt. %, particularly preferably from 20 to 40 wt. % (measured in acetone). The gel content of the graft polymers is determined at 25° C. in a suitable solvent (M. Hoffmann, H. Krömer, R. Kuhn, Polymeranalytik I and II, Georg Thieme-Verlag, Stuttgart 1977).

Particularly preferred polymers C are, for example, ABS polymers prepared by radical polymerisation (emulsion, mass, solution and suspension ABS), as are described, for example, in DE-A 2 035 390 (=U.S. Pat. No. 3,644,574) or in DE-A 2 248 242 (=GB-PS 1 409 275) or in Ullmanns Enzyklopädie der Technischen Chemie, Vol. 19 (1980), p. 280 ff. Particularly preferred polymers C are ABS polymers prepared by mass, solution or suspension polymerisation.

The graft polymer C comprises free copolymer of C.1.1 and C.1.2, that is to say copolymer that is not chemically bonded to the rubber base, which is distinguished by the fact that it can be dissolved in suitable solvents (e.g. acetone).

Component C preferably contains a free copolymer of C.1.1 and C.1.2 which has a weight-average molecular weight (Mw), determined by gel permeation chromatography, of from 60,000 to 150,000 g/mol, preferably from 70,000 to 130,000 g/mol, particularly preferably from 70,000 to 90,000 g/mol.

Component D

Component D preferably comprises one or more thermoplastic vinyl (co)polymers D.1 and/or polyalkylene terephthalates D.2.

Suitable vinyl (co)polymers D.1 include polymers of at least one monomer from the group of the vinyl aromatic compounds, vinyl cyanides (unsaturated nitriles), (meth) acrylic acid $(C_1-C_8)$-alkyl esters, unsaturated carboxylic acids and derivatives (such as anhydrides and imides) of unsaturated carboxylic acids. Particularly suitable are (co)polymers of D.1.1 from 50 to 99 parts by weight, preferably from 60 to 80 parts by weight, in particular from 70 to 80 parts by weight, of vinyl aromatic compounds and/or vinyl aromatic compounds substituted on the ring (such as styrene, α-methylstyrene, p-methylstyrene, p-chlorostyrene) and/or (meth)acrylic acid $(C_1-C_8)$-alkyl esters (such as methyl methacrylate, ethyl methacrylate), and D.1.2 from 1 to 50 parts by weight, preferably from 20 to 40 parts by weight, in particular from 20 to 30 parts by weight, of vinyl cyanides (unsaturated nitriles), such as acrylonitrile and methacrylonitrile, and/or (meth) acrylic acid $(C_1-C_8)$-alkyl esters, such as methyl methacrylate, n-butyl acrylate, tert.-butyl acrylate, and/or unsaturated carboxylic acids, such as maleic acid, and/or derivatives, such as anhydrides and imides, of unsaturated carboxylic acids (for example maleic anhydride and N-phenylmaleimide).

The vinyl (co)polymers D.1 are typically resin-like, thermoplastic and rubber-free. Particular preference is given to the copolymer of D.1.1 styrene and D.1.2 acrylonitrile.

The (co)polymers according to D.1 are known and can be prepared, for example, by radical polymerisation, in particular by emulsion, suspension, solution or mass polymerisation. The (co)polymers preferably have mean molecular weights Mw (weight-average, determined by light scattering or sedimentation) of from 15,000 to 200,000 g/mol, particularly preferably from 60,000 to 150,000 g/mol, in particular from 70,000 to 130,000 g/mol.

The polyalkylene terephthalates of component D.2 are preferably reaction products of aromatic dicarboxylic acids or their reactive derivatives, such as dimethyl esters or anhydrides, and aliphatic, cycloaliphatic or araliphatic diols, as well as mixtures of such reaction products.

Preferred polyalkylene terephthalates generally contain at least 80 wt. %, preferably at least 90 wt. %, based on the dicarboxylic acid component, terephthalic acid radicals and at least 80 wt. %, preferably at least 90 wt. %, based on the diol component, ethylene glycol and/or 1,4-butanediol radicals.

As well as containing terephthalic acid radicals, the preferred polyalkylene terephthalates can contain, for example, up to 20 mol %, preferably up to 10 mol %, of radicals of other aromatic or cycloaliphatic dicarboxylic acids having from 8 to 14 carbon atoms or of aliphatic dicarboxylic acids having from 4 to 12 carbon atoms, for example radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

As well as containing ethylene glycol or 1,3-propanediol or 1,4-butanediol radicals, the preferred polyalkylene terephthalates can contain up to 20 mol % of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-methyl-2,4-pentanediol, 2-methyl-2,4-pentanediol, 2,2,4-trimethyl-1,3-pentanediol and 2-ethyl-1,6-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(3-β-hydroxyethoxyphenyl)-propane and 2,2-bis-(4-hydroxypropoxyphenyl)-propane (DE-A 24 07 674, 24 07 776, 27 15 932).

The polyalkylene terephthalates can be branched, for example, by incorporation of relatively small amounts of tri- or tetra-hydric alcohols or tri- or tetra-basic carboxylic acids, for example according to DE-A 1 900 270 and U.S. Pat. No. 3,692,744. Examples of preferred branching agents include trimesic acid, trimellitic acid, trimethylolethane, trimethylolpropane and pentaerythritol.

Particular preference in some embodiments is given to polyalkylene terephthalates that have been prepared solely from terephthalic acid and reactive derivatives thereof (e.g. dialkyl esters thereof) and ethylene glycol and/or 1,4-butanediol, and mixtures of such polyalkylene terephthalates.

Mixtures of polyalkylene terephthalates preferably contain from 1 to 50 wt. %, preferably from 1 to 30 wt. %, polyethylene terephthalate and from 50 to 99 wt. %, preferably from 70 to 99 wt. %, polybutylene terephthalate.

The polyalkylene terephthalates that are preferably used generally have a limiting viscosity of from 0.4 to 1.5 dl/g, preferably from 0.5 to 1.2 dl/g, measured in phenol/o-dichlorobenzene (1:1 parts by weight) at 25° C. in an Ubbelohde viscometer.

The polyalkylene terephthalates can be prepared by known methods (see e.g. Kunststoff-Handbuch, Volume VIII, p. 695 ff, Carl-Hanser-Verlag, Munich 1973).

Component E

The composition can optionally further comprise one or more commercially available additives according to component E, such as lubricants, demoulding agents (for example pentaerythritol tetrastearate), nucleating agents, stabilisers, antistatics (for example conductive blacks, carbon fibres, carbon nanotubes and organic antistatics such as polyalkylene ethers, alkylsulfonates or polyamide-containing polymers), acids, fillers and reinforcing materials (for example glass or carbon fibres, mica, kaolin, talc, $CaCO_3$ and glass flakes) as well as colourings and pigments. Other additives known in the art or otherwise can also be included if desired for any reason.

Preparation of the Moulding Compositions and Moulded Articles

The thermoplastic moulding compositions can be prepared, for example, by mixing the respective constituents in a known manner and melt compounding and melt extruding the mixture at temperatures of from 220° C. to 320° C., preferably from 240° C. to 300° C., in conventional devices such as internal kneaders, extruders and twin-shaft screws.

Mixing of the individual constituents can be carried out, in known manner, i.e., either in succession or simultaneously, either at about 20° C. (room temperature) or at a higher temperature.

Also provided is a process for the preparation of the moulding compositions and the use of the moulding compositions in the production of moulded articles, and the moulded articles themselves.

The moulding compositions can be used in the production of moulded articles of any kind. These can be produced by injection moulding, extrusion and blow moulding processes. A further form of processing is the production of moulded articles by deep-drawing from previously produced sheets or films.

Examples of such moulded articles are films, profiles, casing parts of any kind, for example for domestic appliances such as televisions, juice extractors, coffee makers, mixers; for office equipment such as monitors, flat screens, notebooks, printers, copiers; sheets, tubes, conduits for electrical installations, windows, doors and further profiles for the construction sector (interior fitting and external applications) as well as parts for electronics and electrical engineering, such as switches, plugs and sockets, as well as bodywork and interior components for commercial vehicles, in particular for the automotive sector.

In particular, the moulding compositions can also be used, for example, in the production of the following moulded articles or mouldings: Parts for the interior finishing of railway vehicles, ships, aircraft, buses and other motor vehicles, casings for electrical devices containing small transformers, casings for devices for disseminating and transmitting information, casings and coverings for medical devices, massage devices and casings therefor, toy vehicles for children, prefabricated wall panels, casings for security devices and for televisions, heat-insulated transport containers, mouldings for sanitary and bathroom fittings, cover grids for ventilator openings, and casings for garden equipment.

The following examples serve to explain the invention further.

EXAMPLES

Component A

Unbranched polycarbonate based on bisphenol A having a relative solution viscosity of $\eta_{rel}=1.28$, measured in $CH_2Cl_2$ as solvent at 25° C. and at a concentration of 0.5 g/100 ml.

Component B-1

Impact modifier, graft polymer of
B-1.1 11 wt. % methyl methacrylate on
B-1.2 89 wt. % of a silicone-acrylate composite rubber as graft base, the silicone-acrylate rubber comprising
B-1.2.1 92 wt. % silicone rubber and
B-1.2.2 8 wt. % polybutyl acrylate rubber, and
the two mentioned rubber components B-1.2.1 and B-1.2.2 interpenetrating in the composite rubber so that they cannot substantially be separated from one another.

Component B-2

Impact modifier, graft polymer of
B-2.1 17 wt. % methyl methacrylate on
B-2.2 83 wt. % of a silicone-acrylate composite rubber as graft base, the silicone-acrylate rubber comprising
B-2.2.1 11 wt. % silicone rubber and
B-2.2.2 89 wt. % polybutyl acrylate rubber, and
the two mentioned rubber components B-2.2.1 and B-2.2.2 interpenetrating in the composite rubber so that they cannot substantially be separated from one another.

Component C-1

ABS polymer prepared by mass polymerisation of 82 wt. %, based on the ABS polymer, of a mixture of 24 wt. % acrylonitrile and 76 wt. % styrene in the presence of 18 wt. %, based on the ABS polymer, of a polybutadiene-styrene block copolymer rubber having a styrene content of 26 wt. %. The weight-average molecular weight $M_w$ of the free SAN copolymer component in the ABS polymer is 80,000 g/mol (measured by GPC in THF). The gel content of the ABS polymer is 24 wt. % (measured in acetone).

Component C-2

ABS polymer prepared by mass polymerisation, wherein the weight ratio acrylonitrile:butadiene:styrene is 20:16:64. The weight-average molecular weight $M_w$ of the free SAN copolymer component in the ABS polymer is 168,000 g/mol (measured by GPC in THF). The gel content of the ABS polymer is 30 wt. % (measured in acetone).

Component D

Copolymer of 77 wt. % styrene and 23 wt. % acrylonitrile having a weight-average molecular weight $M_w$ of 130 kg/mol (determined by GPC), prepared by the mass process.

Component E

Component E-1: pentaerythritol tetrastearate
Component E-2: IRGANOX® B900 (manufacturer: Ciba Specialty Chemicals Inc., Basel, Switzerland)
Preparation and Testing of the Moulding Compositions The individual substances listed in Tables 1-2 are compounded at a speed of 225 rpm and with a throughput of 20 kg/h, at a machine temperature of 260° C., on a twin-screw extruder (ZSK-25) (Werner and Pfleiderer) and then granulated.

The finished granules are processed on an injection-moulding machine to the corresponding test specimens (melt temperature 260° C., tool temperature 80° C., flow front speed 240 mm/s). Characterisation is made in accordance with DIN EN ISO 527 (elongation at tear, determined by the tensile test), ISO 11443 (melt viscosity at 260° C. and shear rate of $1000 \, s^{-1}$) and DIN EN ISO 1133 (melt volume flow rate MVR at 260° C. and a die load of 5 kg).

The change in the MVR measured in accordance with ISO 1133 at 260° C. with a die load of 5 kg on storage of the granules for 7 days at 95° C. and 100% relative humidity ("FWL storage") is used as a measure of the hydrolytic stability of the prepared compositions. The increase in the MVR value compared with the MVR value prior to storage is calculated as ΔMVR(hydr.), which is defined by the following formula:

$$\Delta MVR(hydr.) = \frac{MVR(\text{after } FWL \text{ storage}) - MVR(\text{prior to storage})}{MVR(\text{prior to storage})} \cdot 100\%$$

It is clear from Table 1 that the compositions of Examples 1 and 3 have a higher hydrolytic stability, a higher elongation at tear and a lower melt viscosity compared with the compositions of the comparison examples.

TABLE 1

Compositions and their properties

| Components (parts by weight) | | 1 | 2 (comp.) | 3 | 4 (comp.) |
|---|---|---|---|---|---|
| A | | 70.1 | 70.1 | 70.1 | 70.1 |
| B-1 | | 10.8 | | | 6.0 |
| B-2 | | | 10.8 | | 6.0 |
| C-1 | | 6.0 | 6.0 | 10.8 | 10.8 |
| D | | 13.1 | 13.1 | 13.1 | 13.1 |
| E-1 | | 0.8 | 0.8 | 0.8 | 0.8 |
| E-2 | | 0.1 | 0.1 | 0.1 | 0.1 |
| Properties | | | | | |
| Melt viscosity 260° C. [1000 s−1] | Pa · s | 204 | 262 | 207 | 238 |
| MVR 260° C./5 kg | cm³/10 min. | 15 | 14 | 20 | 17 |
| Elongation at tear | % | 134 | 113 | 128 | 115 |
| ΔMVR (hydr.) | % | 7 | 200 | 15 | 71 |

The ABS polymer C-2 contains free copolymer, that is to say copolymer that is not bonded to the rubber, having a higher molar mass than in the ABS polymer C-1. It is clear from Table 2 that the compositions comprising component C-1 (Examples 5 and 7) have a higher hydrolytic stability, a higher elongation at tear and a lower melt viscosity compared with the compositions of Comparison Examples 6 and 8 containing component C-2.

TABLE 2

Compositions and their properties

| Components (parts by weight) | | 5 | 6 (comp.) | 7 | 8 (comp.) |
|---|---|---|---|---|---|
| A | | 67.1 | 67.1 | 65.8 | 65.8 |
| B-1 | | 4.6 | 4.6 | 4.6 | 4.6 |
| C-1 | | 13.2 | | 24.6 | |
| C-2 | | | 13.2 | | 24.6 |
| D | | 15.2 | 15.2 | 5.1 | 5.1 |
| E-1 | | 0.8 | 0.8 | 0.8 | 0.8 |
| E-2 | | 0.1 | 0.1 | 0.1 | 0.1 |
| Properties | | | | | |
| Melt viscosity 260° C. [1000 s−1] | Pa · s | 193 | 198 | 194 | 216 |
| MVR 260° C./5 kg | cm³/10 min. | 24 | 22 | 25 | 21 |
| Elongation at tear | % | 121 | 114 | 120 | 120 |
| ΔMVR (hydr.) | % | 5 | 6 | 10 | 13 |

Having disclosed the subject matter of the present disclosure, it should be apparent that many modifications, substitutions and variations are possible in light thereof. It is to be understood that embodiments can be practiced other than as specifically described. Such modifications, substitutions and variations are intended to be within the scope of the present application. As used in the instant disclosure and following claims, articles such as "a", "the" and so on can connote the singular or the plural of the object following.

The invention claimed is:

1. A composition comprising:
A) from 40 to 99 parts by weight, in each case based on the sum of the parts by weight of components A+B+C+D, of aromatic polycarbonate and/or aromatic polyester carbonate,
B) from 0.5 to 20 parts by weight, in each case based on the sum of the parts by weight of components A+B+C+D, of a first graft polymer, wherein the graft base is a silicone-acrylate composite rubber of silicone rubber and polyalkyl (meth)acrylate rubber, and wherein the amount of silicone rubber is present in an amount from 65 to 95 wt. % based on the graft base,
C) from 0.5 to 40 parts by weight, in each case based on the sum of the parts by weight of components A+B+C+D, of a second graft polymer comprising a copolymer that is not chemically bonded to rubber, and having a weight-average molecular weight of from 60,000 to 150,000 g/mol and
D) from 0 to 20 parts by weight, based on the sum of the parts by weight of components A+B+C+D, of at least one polymer selected from the group consisting of rubber-free vinyl (co)polymer and polyalkylene terephthalate,
wherein the composition is free of flameproofing agents.

2. A composition according to claim 1, comprising as component B, a graft polymer of
B.1 from 5 to 95 wt. % of one or more vinyl monomers on
B.2 from 95 to 5 wt. % of one or more silicone-acrylate composite rubbers as graft base, wherein the silicone-acrylate rubber comprises
B.2.1 from 65 to 95 wt. % silicone rubber and
B.2.2 from 35 to 5 wt. % polyalkyl (meth)acrylate rubber,
wherein the two mentioned rubber components B.2.1 and B.2.2 interpenetrate in the composite rubber such that B.2.2 and B.2.2 cannot substantially be separated from one another.

3. A composition according to claim 2, wherein the vinyl monomer B.1 is at least one selected from the group consisting of styrene, α-methylstyrene, methyl methacrylate, n-butyl acrylate and acrylonitrile.

4. A composition according to claim 1 comprising as component C, a graft polymer of
C.1) from 5 to 95 wt. %, based on component C, of a mixture of
C.1.1) from 65 to 85 wt. %, based on C.1, of at least one monomer selected from the group consisting of the vinyl aromatic compounds, vinyl aromatic compounds substituted on the ring, and methacrylic acid ($C_1$-$C_8$)-alkyl esters and
C.1.2) from 15 to 35 wt. %, based on C.1, of at least one monomer selected from the group consisting of the vinyl cyanides, (meth)acrylic acid ($C_1$-$C_8$)-alkyl esters and derivatives of unsaturated carboxylic acids
on
C.2) from 95 to 5 wt. % of at least one graft base having a glass transition temperature <0° C., the graft base C.2) having a mean particle size, $d_{50}$ value, of from 0.05 to 10 μm.

5. A composition according to claim 4, wherein the graft base C.2 is selected from the group consisting of diene rubbers, diene-vinyl block copolymer rubbers, ethylene/propylene rubbers, ethylene/propylene/diene rubbers, acrylate, polyurethane, silicone, chloroprene and ethylene/vinyl acetate rubbers, with the proviso that mixtures containing silicone rubber and acrylate rubber are not included.

6. A composition according to claim 1, comprising as component C, a copolymer that is not chemically bonded to rubber, having a weight-average molecular weight of from 70,000 to 90,000 g/mol.

7. A composition according to claim 4, comprising as component C, a graft polymer prepared by a mass, solution and/or mass-suspension polymerisation process, and having a rubber content, content of component C.2 in the graft polymer C, of from 10 to 20 wt. %, as well as a graft shell which contains, in each case based on monomers of the graft shell, from 20 to 30 wt. % of at least one monomer according to C.1.2, and from 70 to 80 wt. % of at least one monomer according to C.1.1.

8. A composition according to claim 1, comprising as component D, from 3 to 16 parts by weight, based on the sum of the parts by weight of components A+B+C+D, of at least one polymer selected from the group consisting of rubber-free vinyl (co)polymer D.1 and polyalkylene terephthalate D.2.

9. A composition according to claim 1, comprising from 0 to 50 parts by weight, in each case based on the sum of the parts by weight of components A+B+C+D, of at least one additive selected from the group consisting of lubricants, demoulding agents, nucleating agents, stabilisers, antistatics, acids, fillers, reinforcing materials, colourings and pigments.

10. A composition consisting essentially of
A) from 40 to 99 parts by weight, in each case based on the sum of the parts by weight of components A+B+C+D, of an aromatic polycarbonate and/or aromatic polyester carbonate,
B) from 0.5 to 20 parts by weight, in each case based on the sum of the parts by weight of components A+B+C+D, of a first graft polymer, wherein the graft base is a silicone-acrylate composite rubber of interpenetrating silicone rubber and polyalkyl (meth)acrylate rubber, wherein the amount of silicone rubber is from 65 to 95 wt. %, based on the graft base,
C) from 0.5 to 20 parts by weight, based on the sum of the parts by weight of components A+B+C+D, of a second graft polymer comprising a copolymer that is not chemically bonded to rubber, and having a weight-average molecular weight of from 60,000 to 150,000 g/mol, and
D) from 3 to 16 parts by weight, based on the sum of the parts by weight of components A+B+C+D, of at least one polymer selected from the group consisting of rubber-free vinyl (co)polymer and polyalkylene terephthalate.

11. A composition according to claim 10, wherein the amount of component B is from 8 to 13 parts by weight, based on the sum of the parts by weight of components A+B+C+D, and the amount of component C is from 7 to 16 parts by weight, based on the sum of the parts by weight of components A+B+C+D.

12. A moulded article comprising a composition of claim 1.

13. A moulded article comprising a composition according to claim 10.

14. A moulded article according to claim 13, wherein the moulded article is part of a motor vehicle, a railway vehicle, an aircraft, a water craft, a film, a profile, and/or a casing part of any kind.

15. A composition of claim 10 that consists of A, B, C, and D.

16. A method for preparing a moulded article of claim 12, comprising mixing A, B, C and D to form a mixture, and melt compounding and melt extruding the mixture.

17. A method of claim 16, wherein said method is conducted at a temperature of from 220 C to 320 C.

18. A method of claim 16, wherein said method is conducted using an internal kneader, an extruder and/or a twin-shaft screw.

19. The composition of claim 10 further consisting essentially of
E) from 0.5 to 25 parts by weight, in each case based on the sum of the parts by weight of components A+B+C+D, of at least one additive selected from the group consisting of lubricants, demoulding agents, nucleating agents, stabilisers, antistatics, acids, fillers, reinforcing materials, colourings and pigments.

20. The composition according to claim 1, wherein the amount of silicone rubber in component B is present in an amount from 80 to 95 wt. % based on the graft base.

* * * * *